United States Patent [19]

Hull

[11] Patent Number: 6,079,267

[45] Date of Patent: Jun. 27, 2000

[54] METHOD AND APPARATUS FOR MEASURING GRAVITATIONAL ACCELERATION UTILIZING A HIGH TEMPERATURE SUPERCONDUCTING BEARING

[75] Inventor: John R. Hull, Downers Grove, Ill.

[73] Assignee: The United States of America as represented by the United States Department of Energy, Washington, D.C.

[21] Appl. No.: 09/186,606

[22] Filed: Nov. 6, 1998

[51] Int. Cl.[7] ............................. G01M 1/12; G05G 1/00
[52] U.S. Cl. ...................... 73/382 R; 310/90.5; 74/572
[58] Field of Search .................. 73/382 R, 383, 73/382 G; 74/572, 573 R; 310/349, 90.5; 505/166

[56] References Cited

U.S. PATENT DOCUMENTS

| | | | |
|---|---|---|---|
| 3,722,285 | 3/1973 | Weber | 73/382 G |
| 5,111,140 | 5/1992 | Takahata | 324/228 |
| 5,204,568 | 4/1993 | Kleinberg et al. | 310/90.5 |
| 5,214,981 | 6/1993 | Weinberger et al. | 74/573 |
| 5,540,116 | 7/1996 | Hull et al. | 74/572 |
| 5,542,506 | 8/1996 | McMichael et al. | 505/100 |
| 5,554,583 | 9/1996 | Hull et al. | 505/166 |
| 5,563,565 | 10/1996 | Hull | 335/216 |
| 5,631,617 | 5/1997 | Morishita | 310/90.5 |
| 5,640,887 | 6/1997 | Hull et al. | 74/572 |
| 5,654,683 | 8/1997 | Hull | 335/296 |
| 5,722,303 | 3/1998 | Hull et al. | 74/572 |
| 5,724,820 | 3/1998 | Iwasa | 62/51.1 |
| 5,831,362 | 11/1998 | Chu et al. | 310/90.5 |

OTHER PUBLICATIONS

U.S. Patent Application Ser. No. 08/247,566, filed on May 23, 1994.
*Sensitive and Rugged Borehole Gravimeter*, Funding Proposal submitted and presented by John Hull, among others, on Nov. 10, 1998.
*Gravimeter Using High–Temperature Superconducting Bearing*, by John R. Hull and Thomas M. Mulcahy, presented at the Applied Superconductivity Conference, Sep., 1998.
*A Superconducting Gravimeter*, by W. A. Prothero, Jr. and J.M. Goodkind, Sep. 1968.

*Primary Examiner*—Hezron Williams
*Assistant Examiner*—Helen C. Kwok
*Attorney, Agent, or Firm*—Bradley W. Smith; Mark P. Dvorscak; William R. Moser

[57] ABSTRACT

Gravitational acceleration is measured in all spatial dimensions with improved sensitivity by utilizing a high temperature superconducting (HTS) gravimeter. The HTS gravimeter is comprised of a permanent magnet suspended in a spaced relationship from a high temperature superconductor, and a cantilever having a mass at its free end is connected to the permanent magnet at its fixed end. The permanent magnet and superconductor combine to form a bearing platform with extremely low frictional losses, and the rotational displacement of the mass is measured to determine gravitational acceleration. Employing a high temperature superconductor component has the significant advantage of having an operating temperature at or below 77K, whereby cooling may be accomplished with liquid nitrogen.

20 Claims, 4 Drawing Sheets

METHOD AND APPARATUS FOR MEASURING GRAVITATIONAL ACCELERATION UTILIZING A HIGH TEMPERATURE SUPERCONDUCTING BEARING

CONTRACTUAL ORIGIN OF THE INVENTION

The United States Government has rights in this invention pursuant to Contract Number W-31-109-ENG-38 between the United States Department of Energy and Argonne National Laboratory, as represented by the University of Chicago.

TECHNICAL FIELD

The present invention relates to superconducting gravimeters, and, in particular, to a highly sensitive gravimeter comprising an extremely low-friction high temperature superconductor bearing.

BACKGROUND OF INVENTION

Gravimeters are instruments for measuring the acceleration of gravity, typically described in units of Gal, wherein Gal=cm/s$^2$. Gravimeters are frequently used in geological surveys to detect oil reserves and mineral deposits, or measure tidal currents and movements of the earth's crust, among others. Traditional gravimeters rely on measuring the vertical displacement of a mass suspended on a mechanical spring or measuring the free-fall acceleration of a mass from a predetermined height. Torsional pendulums are a variation of the traditional approach often used for basic scientific studies, such as measuring the gravitation constant (G). Torsional pendulums are comprised of a pair of masses suspended from a fiber, whereby the restoring torque of the fiber and the supportable weight are proportionally related to the diameter of the fiber. A ferromagnetic rotor and active magnetic bearings are useful for levitation purposes to alleviate stability and fiber breakage in torsional pendulums, however, the lack of constancy of restoring torque to the fiber has been a persistent problem.

Another approach measures the movement of a superconducting detector mass or sphere levitated by a magnetic field generated by superconducting coils. As shown in FIG. 1, a superconducting gravimeter 10 uses the Meissner effect to suspend a superconducting niobium (or lead) sphere 12, as detector mass, in a magnetic field created by a persistent current in a superconducting coil(s) 14a, 14b, within a vacuum housing 20 containing low-pressure helium gas. The superconductors are Type I, i.e., mainly pure metals featuring perfect diamagnetism up to a critical magnetic field strength, whereupon superconductivity is lost and the magnetization of the superconductor abruptly disappears. Since Type I superconductors are only stable at very low temperatures of about 15K, the superconductor gravimeter 10 is maintained at 4.2K by suspension in liquid helium. The current in the superconducting coil(s) 14a, 14b provides a stable vertical force sufficient to support the weight of the sphere 12, with a vertical force gradient sufficiently weak to allow measurement of changes in the gravitational force. Capacitance sensing plates 16 are arranged symmetrically about the sphere.

Although superconductor gravimeters provide improved stability and sensitivity (about 1 nGal), Type-I superconductivity is lost in very weak magnetic fields, such that the detector masses are severely limited in size and their levitation becomes unstable at low chamber pressures. Type I superconductors are also not stable against rotational movement, and where rotational or vibrational modes are excited within the gravimeter, a time delay must occur to allow these modes to sufficiently decay before measurements are made. Yet another disadvantage of Type-I superconductor gravimeters is their extreme sensitivity to temperature; all low-temperature superconductor gravimeters must be controlled within 5 $\mu$K.

The above described gravimeters essentially measure only the vertical component of gravity, and, although measuring other spatial components of gravity is principally possible using the Type I superconductor gravimeter, the necessity of operating in a liquid helium environment makes such a measurement generally impractical.

Recently, low-friction bearings comprised of a permanent magnet levitated over a high temperature superconductor (HTS) have been developed. The levitation is passively stable with moderate stiffness in radial, vertical, and tilt direction, and low resistance to rotational motion. For example, HTS bearings have coefficients of friction as low as 10$^{-8}$. Advantageously, HTS materials, such as YBa$_2$Cu$_3$O$_7$, exhibit low electrical resistance at or below a critical temperature above the boiling point of nitrogen (77K), and, therefore, HTS applications allow cooling with liquid nitrogen, a significantly more efficient and less expensive refrigerant than liquid helium.

The present invention is a high temperature superconducting (HTS) gravimeter comprising a permanent magnet levitated above or otherwise magnetically held in a spaced relationship with a high temperature superconductor, a cantilever having a mass at one end and connected at its other fixed end to the permanent magnet. Gravity acts on the mass and cantilever, causing measurable rotational acceleration. The HTS gravimeter is highly sensitive (about 1 nGal) and gravitational acceleration is measurable in all spatial directions. In addition, the HTS gravimeter is operable at liquid nitrogen temperatures. The HTS gravimeter may also be miniaturized for specific applications, including oil exploration.

Therefore, in view of the above, a basic object of the present invention is to provide a highly sensitive high temperature superconducting (HTS) gravimeter for measuring the acceleration of gravity in all spatial directions.

Another object of this invention is to provide an HTS gravimeter operable at liquid nitrogen temperatures.

Yet another object of this invention is to provide an HTS gravimeter for measuring the acceleration of gravity in applications having limited space, requiring miniaturization of measurement instruments.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

Briefly, the invention is a high temperature superconducting (HTS) gravimeter comprised of a high temperature superconductor, a permanent magnet levitated above or otherwise magnetically held in a spaced relationship with the superconductor, and a cantilever connected at its fixed end to the permanent magnet and having a mass connected at its free end. The combination of the permanent magnet and superconductor forms a low-friction superconducting bearing, which acts as a pivot for the cantilever. Gravity acts on the cantilever and attached mass, thereby accelerating them, and a detector system measures the movement.

Employing a high temperature superconductor component within the HTS gravimeter has the significant advantage of having an operating temperature at or below 77K, whereby cooling is accomplished with liquid nitrogen rather than liquid helium. In addition, the HTS gravimeter design allows for highly sensitive measurements and for measurements in all spatial directions by rotating the device. The gravimeter may also be miniaturized for use in well borehole applications undertaken in oil exploration or mining applications.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 3b shows a side view of the embodiment illustrated in FIG. 3a; and

DETAILED DESCRIPTION OF THE INVENTION

Figure 1:
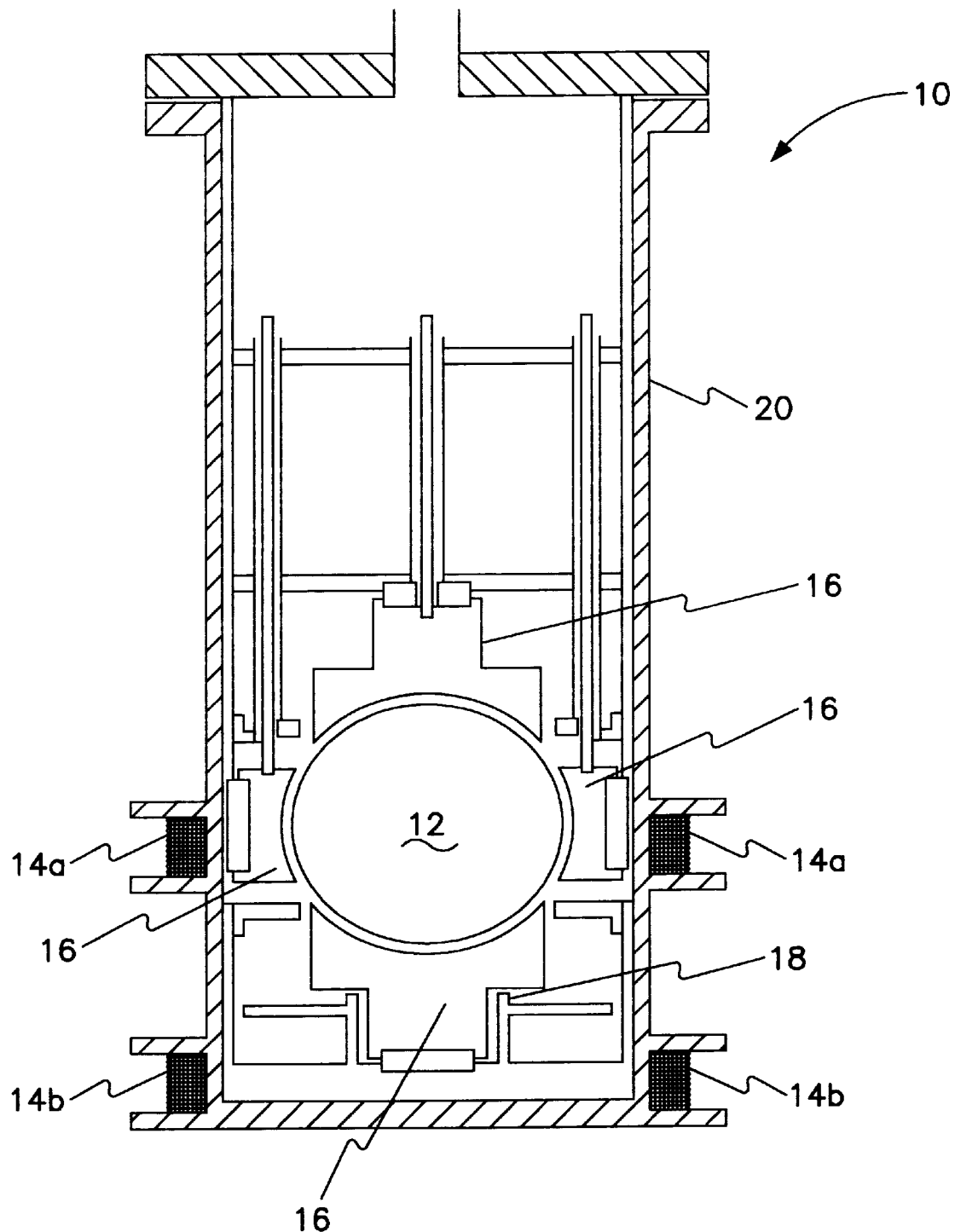
FIG. 1 shows a prior art superconducting gravimeter.
Figure 2:
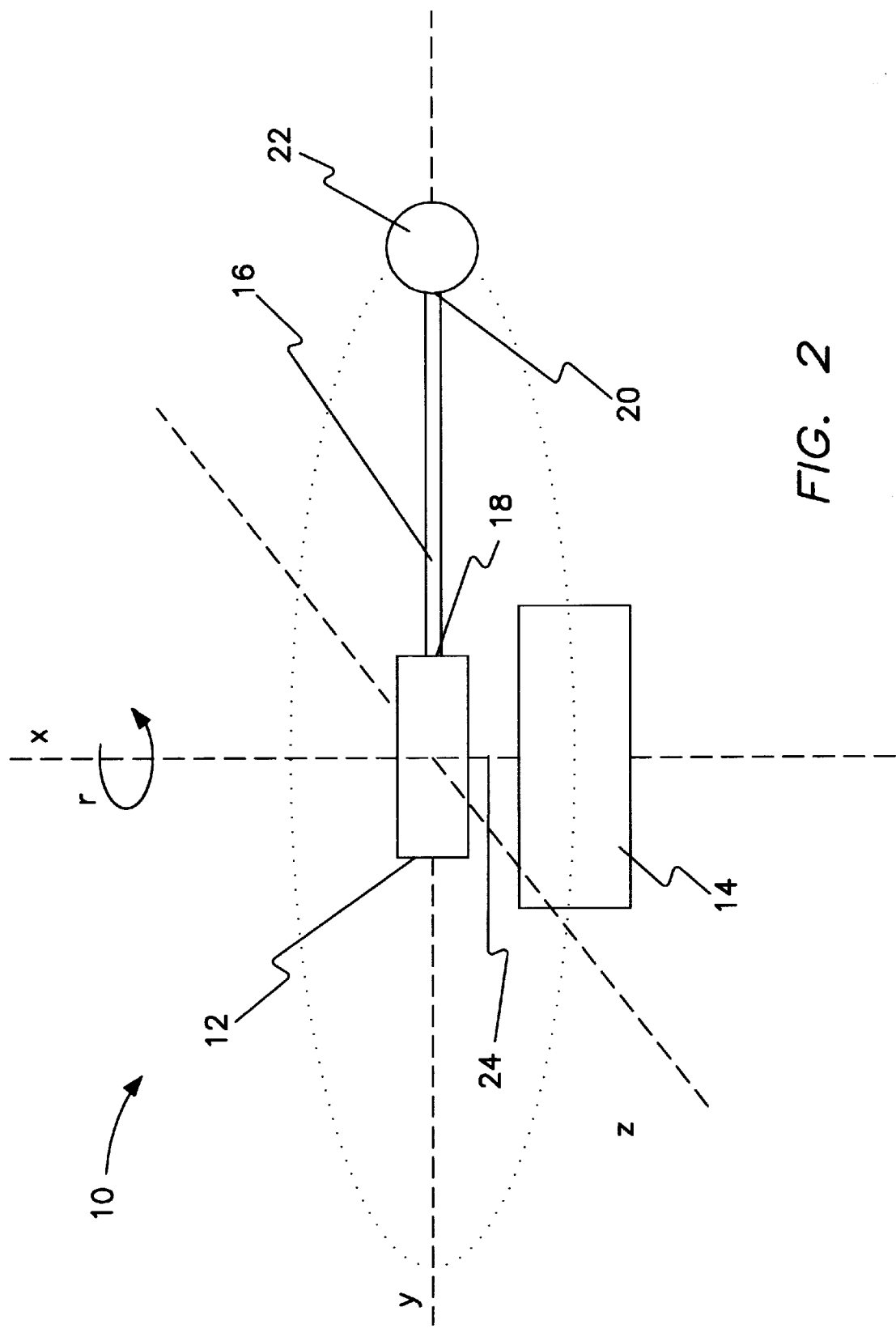
FIG. 2 shows the present high temperature superconducting (HTS) gravimeter.

The present invention relates to a high temperature superconducting (HTS) gravimeter. As shown in FIG. 2, the HTS gravimeter 10 is comprised of a permanent magnet 12 levitated over a high temperature superconductor 14, and a cantilever 16, i.e. a beam fixed at one end, having a mass 22 attached at its free, or distal, end 20 and being attached to the permanent magnet 12 at its fixed end 18. The combination of the permanent magnet 12 and high temperature superconductor 14 form a bearing platform 24 having a low resistance to rotational motion r about axis x in the plane defined by axes y and z, and has a high resistance to both vertical movement and horizontal movement that would act to dislodge the permanent magnet from its levitated position above the superconductor. In other words, the combination of the permanent magnet 12 and high temperature superconductor 14 provides both axial and radial stability, while eliminating frictional losses. The bearing platform 24 serves as a support for the cantilever, and the permanent magnet 12 is symmetrical about its axis of rotation x. In this way, the combination of the permanent magnet 12, high temperature superconductor 14, cantilever 16, and mass 22 acts as a low-loss torsional pendulum operable in any orientation.

The HTS gravimeter 10 is enclosed in a vacuum chamber (not shown). All high temperature superconductor components of the HTS gravimeter are housed in a cryochamber (not shown), such as a G-10 fiberglass-composite cryochamber, and the cryochamber may be cooled with a liquid nitrogen feed from a dewar, or by other means known in the art. In this way, the permanent magnet 12 and high temperature superconductor 14 are field-cooled. Any electrically conducting or magnetic components are far removed from the vicinity of the permanent magnet 12 and HTS components 14.

After the bearing platform 24 is moved, the permanent magnet 12 is free to oscillate about an equilibrium position, and the mass 22 is allowed to respond freely to gravitational forces. For applications where damping is required, a mechanism is provided as an opposing or restoring force, for example, controlled damping may be accomplished with eddy current dampers having an AC current applied to small coils located adjacent to a conducting component of the cantilever, such that a small torsional amplitude is created from the initial levitated position.

In operation, gravity acts on the mass and cantilever to accelerate the mass and cantilever, and a detector system measures their movement. Variations in gravitational acceleration may be detected and measured by techniques known in the art, including time-of-flight acceleration techniques and electrostatic means. The HTS gravimeter illustrated in FIG. 2 measures two horizontal components of gravitational acceleration. It is appreciated that by rotating the HTS gravimeter 90°, one horizontal and one vertical component of the acceleration of gravity is measurable. For example, when the HTS gravimeter 10 illustrated in FIG. 2 is rotated 90° clock-wise in the x-y plane, gravitational acceleration having a vertical and horizontal component is measurable by raising the cantilever to a position in the x-y plane and releasing the cantilever to detect and measure the movement caused by gravitational acceleration.

The detector system may comprise a set of capacitance sensors, a laser interferometer, a superconductor quantum interference device (SQUID), or other device having the ability to measure the position of the mass and/or the cantilever. The motion of the mass and cantilever is detectable either by a time of flight acceleration or a control coil. Alternatively, an electrode may be added to maintain the mass in a stationary position. For example, a small magnet may be added to the cantilever, a mass may be used to interact with a control coil, or a force may be applied by electrostatic means.

Figure 3B:
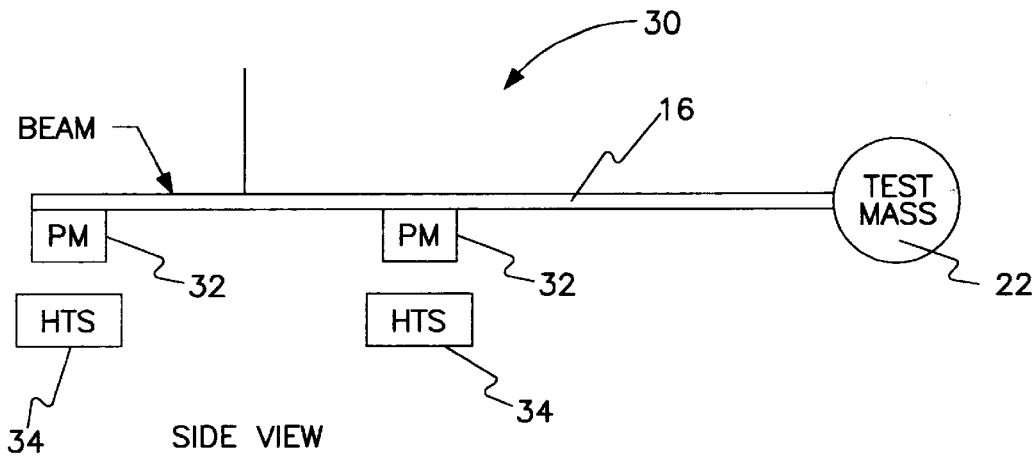
Figure 3A:
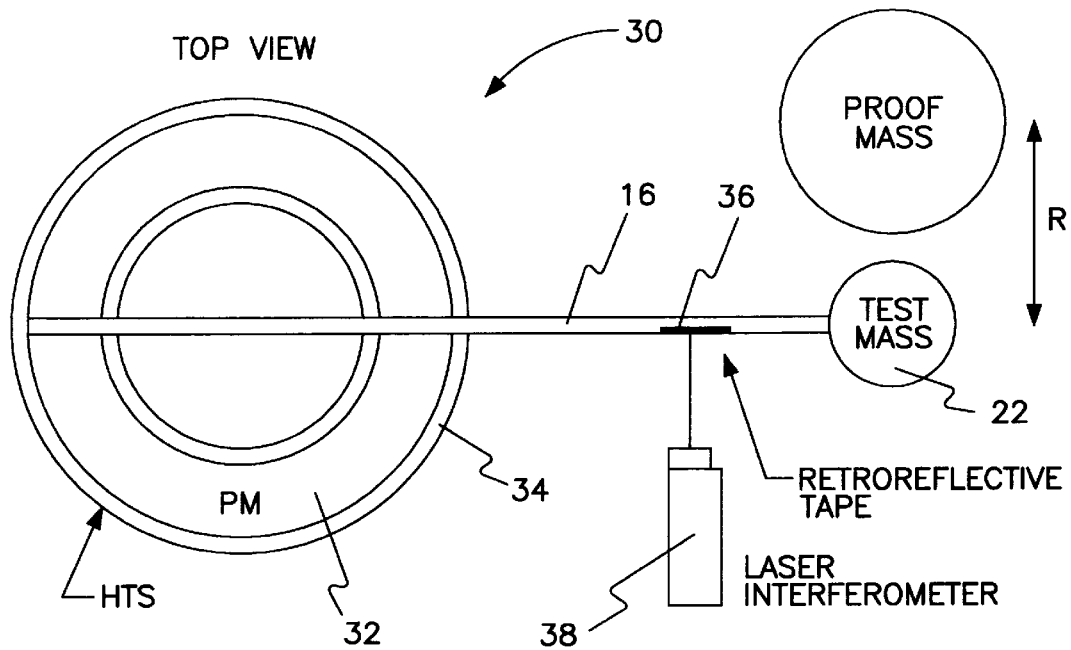
FIG. 3a shows another embodiment of the HTS gravimeter side view of the present HTS gravimeter.

FIGS. 3a and 3b show top and side views of another embodiment 30 of the HTS gravimeter. The permanent magnet 32 and high temperature superconductor 34 are in the shape of rings, and the cantilever 16 is attached to the permanent magnet 32 at its fixed end, and mass 22 is attached at its free, or distal, end. It is appreciated by those skilled in the art that the high temperature superconductor component may be in the form of a single disk (cylinder), a single ring, an array of disks spaced apart and in the form of a ring, or other configurations. A detector system for measuring movement of the cantilever 16 is shown comprised of reflective tape 36 applied to the cantilever and in close proximity to a laser interferometer 38.

Figure 4:
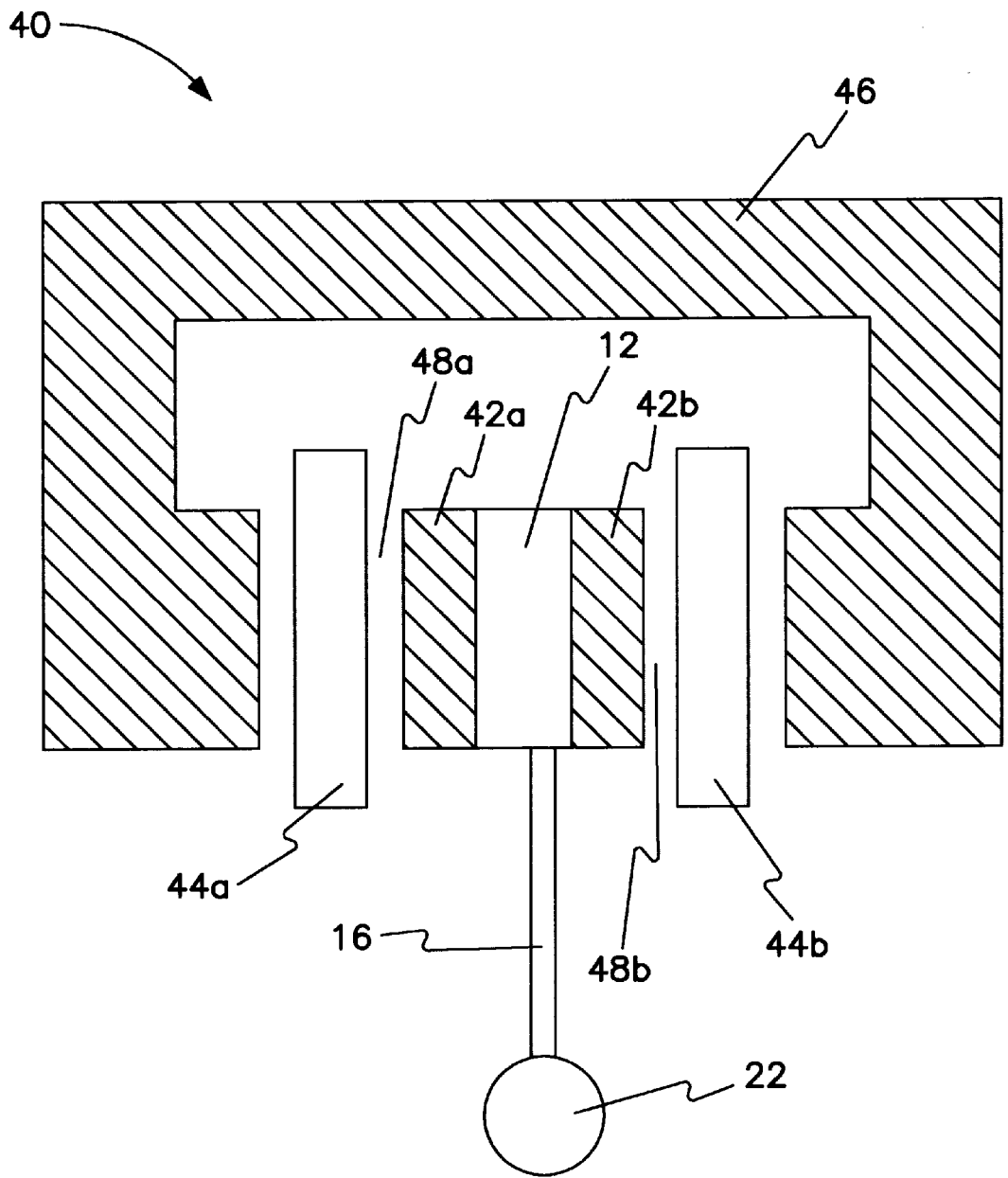
FIG. 4 shows a preferred embodiment of the HTS gravimeter.

FIG. 4 shows a preferred embodiment of the HTS gravimeter 40. The cantilever 16 and mass 22 are attached at the cantilever's 16 distal end to a permanent magnet 12 having iron cladding 42a, 42b. The permanent magnet 12 is levitated and held in a suspended position between high temperature superconductors 44a and 44b, and iron member 46 is included to provide greater flux pinning, such that the permanent magnet 12 is even more resistant to undesired motion, i.e., motion in directions other than rotationally about the created bearing platforms 48a, 48b.

To estimate the sensitivity of the HTS gravimeter, a coefficient of friction for the superconducting bearing platform was estimated at approximately $10^{-8}$, and a drag force for a 1 kg total levitation weight was estimated at approximately $10^{-7}$. Drag force is the average force over a complete rotation resulting from a change in the magnetic field due to magnetic inhomogeneity traversing the high temperature superconductor. For rotations that are a small fraction of a revolution, the drag force is expectedly less, e.g. $10^{-10}$N. To accelerate a 0.1 kg mass positioned a distance from the center of the permanent magnet of 10 times the distance experienced by the drag torque, an acceleration of $10^{-12}$ m/s$^2$ is possible, equal to 0.1 nGal. Significantly, 1 nGal sensitivity is sufficient to detect a 200 gm mass at a distance of 1 meter; therefore, the HTS gravimeter could be used to detect land mines.

Noise also effects the sensitivity of superconductor gravimeters, including ground vibration, electromagnetic effects, and convection. Ground vibrations caused by seismic activity, storms, waves, solar heating, and man-made disturbances are effectively reduced by passive isolation. Electromagnetic effects arising from either external disturbances (natural or man-made) are largely eliminated by shielding. Internal electromagnetic disturbances, such as magnetic impurities in the HTS components and/or electrostatic charge build-up in the mass, must be closely regulated with quality control measures and periodic discharges of any electrostatic build-up. Charging is particularly critical when operating the HTS gravimeter at low air pressures. In addition, temperature fluctuation should be limited, including daily changes in ambient conditions and air drafts, however, maintaining the HTS gravimeter in a vacuum environment minimizes these effects.

The HTS gravimeter has significant advantages over currently known superconductor gravimeters. Importantly, the present HTS gravimeter only requires cooling to liquid nitrogen temperatures (77K), not liquid helium temperatures (4K). Maintaining a constant temperature is also facilitated at these higher temperatures, because of higher heat capacities. The gravimeter is able to measure gravity in all spatial directions. Since the system is rotational in nature, the HTS gravimeter is less sensitive to force gradients present in a suspension system. In addition, the HTS gravimeter design has improved flux pinning that provides stability for the permanent magnet over all chamber pressures and allows larger masses to be levitated which accommodate cantilevers having increased length, such the HTS gravimeter has an increased sensitivity over a given angular motion of about 0.1 nGal.

As a non-limiting example, the HTS gravimeter may be used to measure gravitational acceleration in a borehole application to detect mineral or oil reserves. The vacuum chamber housing the HTS gravimeter is suspended from a lowering device, e.g., mechanical springs, that isolate the gravimeter form background vibrations. The permanent magnet-cantilever-mass system is in a fixed position to prevent damage to the gravimeter during positioning within the borehole. Once in position, the permanent magnet-cantilever system is released, such that it freely rotates under acceleration from external gravitational sources, until forced to stop, for example by a mechanical stop. An interferometer in combination with an electronic clock tracks the distance as a function of time of the cantilever and/or mass, and the measured data is transferred to a recording instrument on ground level through an instrumentation cable, and the gravitational acceleration is calculated therefrom. To conduct another measurement, the cantilever and mass are returned to their initial position. Knowledge of the gravitational acceleration allows determination of the density of the surrounding oil or gas field.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

What is claimed is:

1. A gravimeter, comprising:
    a high temperature superconductor having low electrical resistance at a temperature less than about 77K;
    a permanent magnet suspended by magnetic force in a spaced relationship to said high temperature superconductor, said permanent magnet having an axis of rotation and low resistance to rotation about the axis, said permanent magnet being otherwise stable;
    a cantilever having a fixed end connected to said permanent magnet and a distal end connected to a mass, said cantilever being substantially perpendicular to the axis of rotation of said permanent magnet; and
    means for measuring angular displacement of said mass and said cantilever about the permanent magnet axis of rotation to detect a gravitational force acting on said mass.

2. A gravimeter, comprising:
    first and second high temperature superconductor members, each having low electrical resistance at a temperature less than about 77K;
    a permanent magnet suspended by magnetic force in a spaced relationship between said superconductor members, said permanent magnet having an axis of rotation and low resistance to rotation about the axis, said permanent magnet being otherwise immovable;
    a cantilever having a fixed end connected to said permanent magnet and a distal end connected to a mass, said cantilever being substantially perpendicular to the axis of rotation of said permanent magnet;
    an iron element is disposed in close proximity to said first and second superconductor members to increase flux pinning and
    means for measuring angular displacement of said mass and said cantilever about the permanent magnet axis of rotation to detect a gravitational force acting on said mass.

3. The gravimeter according to claim 1, whereby said permanent magnet is symmetrical about the axis of rotation of said permanent magnet, such that a magnetic field generated by said permanent magnet is circumferentially homogeneous.

4. The gravimeter according to claim 1, further comprising a vacuum chamber for containing said superconductor, said permanent magnet, said cantilever, and said mass.

5. The gravimeter according to claim 4, further comprising a cryogenic container having an interior for enclosing said high temperature superconductor.

6. The gravimeter according to claim 5, further comprising a source of liquid nitrogen for cooling the interior of said cryogenic container.

7. The gravimeter according to claim 1, further comprising means for rotating said gravimeter 90°, whereby a gravitation force in another spatial dimension is measurable.

8. The gravimeter according to claim 1, whereby said measuring means is selected from a group consisting of a set of capacitance sensors, a laser inferometer, and a superconductor quantum interference device.

9. The gravimeter according to claim 1, whereby said gravimeter has a sensitivity for measuring the gravitational force of about 0.1 nGal.

10. The gravimeter according to claim 1, wherein the low resistance to rotation is defined by a coefficient of friction as low as $10^{-8}$.

11. A method for measuring gravitational acceleration, comprising the steps of:

connecting a first end of a cantilever to a permanent magnet;

attaching a mass to a second end of the cantilever;

suspending the permanent magnet having an axis of rotation, by magnetic force in a spaced relationship to a high temperature superconductor having low electrical resistance at a temperature greater than about 77K, such that the permanent magnet is resistant to motion except for rotation about the permanent magnet axis of rotation, a magnetic field generated by the permanent magnet is circumferentially homogeneous, and the cantilever is substantially perpendicular to the axis of rotation of the permanent magnet;

maintaining the high temperature superconductor at a temperature less than about 77K; and measuring angular displacement of the mass and the cantilever to detect the gravitation force acting on the mass.

12. The method according to claim 11, further comprising the step of rotating the cantilever, the mass, the permanent magnet, and the high temperature superconductor 90° to measure gravitation force in another spatial dimension.

13. The method according to claim 11, further comprising the step of enclosing the superconductor, the permanent magnet, the cantilever, and the mass in a vacuum chamber.

14. The method according to claim 13, further comprising the step of enclosing the high temperature superconductor in a cryogenic container having an interior.

15. The method according to claim 14, further comprising the step of cooling an interior of the vacuum chamber with liquid nitrogen.

16. The method according to claim 11, wherein the step of measuring includes utilizing at least one capacitance sensor.

17. The method according to claim 11, wherein the step of measuring includes utilizing a laser interferometer.

18. The method according to claim 11, wherein the step of measuring includes utilizing superconductor quantum interference device.

19. The method according to claim 11, where the step of measuring includes measuring a gravitational force of less than about 0.1 nGal.

20. The method according to claim 11, wherein the resistance to motion about the permanent magnet axis of rotation is defined by a coefficient of friction as low as $10^{-8}$.

* * * * *